United States Patent

[11] 3,628,855

| [72] | Inventor | Donald M. Harvey<br>Webster, N.Y. |
| --- | --- | --- |
| [21] | Appl. No. | 8,194 |
| [22] | Filed | Feb. 3, 1970 |
| [45] | Patented | Dec. 21, 1971 |
| [73] | Assignee | Eastman Kodak Company<br>Rochester, N.Y. |

[54] MOTION PICTURE PROJECTOR WITH APPARATUS FOR EDITING AND SPLICING MOTION PICTURE FILM
31 Claims, 19 Drawing Figs.

[52] U.S. Cl. .................................................... 352/130, 156/504, 156/506
[51] Int. Cl. ............................................................ G03c 11/00
[50] Field of Search ............................................. 352/129, 130, 131; 156/502, 504, 505, 506, 517

[56] References Cited
UNITED STATES PATENTS

| 2,906,167 | 9/1959 | Castedello .................. | 352/129 X |
| 3,152,227 | 10/1964 | Durio .......................... | 156/506 |

*Primary Examiner*—S. Clement Swisher
*Attorneys*—Robert W. Hampton and William C. Dixon, III ABSTRACT: A motion picture projector is provided which includes editing and splicing apparatus located between the projector film gate and the film takeup reel. Upon a first operation of the apparatus, a frame counter activates the film transport claw to advance a predetermined number of frames from the film gate to a cutting member, which makes a first cut of the film and directs the leading end of the portion of the film to be removed toward a festoon chamber. Upon a second operation of the apparatus, the frame counter again activates the film transport claw to advance the predetermined number of frames from the film gate to the cutting member, which then makes a second cut of the film and aligns the film ends remaining to be spliced. A splicing device then transfers a predetermined amount of splicing material to the aligned film ends to form a permanent splice.

FIG. 1

INVENTOR.
DONALD MALCOLM HARVEY
BY William C. Dixon
Robert W. Hampton
ATTORNEYS

INVENTOR.
DONALD MALCOLM HARVEY
BY William C. Oxton, III
Robert W. Hampton
ATTORNEYS

INVENTOR.
DONALD MALCOLM HARVEY

INVENTOR.
DONALD MALCOLM HARVEY

BY William C. Dixon, III
Robert W Hampton
ATTORNEYS

MOTION PICTURE PROJECTOR WITH APPARATUS FOR EDITING AND SPLICING MOTION PICTURE FILM

BACKGROUND OF THE INVENTION

1. Field of the Invention

This invention relates generally to motion picture projectors, and particularly to apparatus for editing and splicing motion picture film in such projectors.

2. Description of the Prior Art

Heretofore, editing and splicing of amateur made motion picture films have been effected with film editors and film splicers that have been marketed as separate items or that have been supplied as separately functioning units mounted on a common frame. In either case, the film to be edited has been viewed under a lesser magnification than that afforded by a conventional motion picture projector. The film has then been marked where the splicing is desired and moved to the splicing unit, where the splicing operation has been performed manually. The results of such editing and splicing have then been checked by running the film through a projector for display on a projection screen.

Some expensive projectors have included editing devices provided with a small viewing screen mounted in the projector. Again, the film has been viewed on the screen provided under a lesser magnification than that afforded by the projector proper, and a manually operated splicing unit has been used to cut out the marked portions of film and to make the splice.

The cost and complexity of such film editors and film splicers, the manipulative dexterity required to perform the manual editing and splicing operations properly, and the time consumed in performing such operations has detracted from the enjoyment of viewing amateur made motion picture films, and have discouraged many consumers from attempting to edit their films, even though they have recognized that edited films provide enhanced viewing enjoyment.

SUMMARY OF THE INVENTION

It is an object of the present invention to provide a novel film editing and splicing apparatus.

It is another object of the invention to provide a novel film editing and splicing apparatus that requires a minimum of attention by the operator.

A further object of the invention is to provide a novel motion picture projector with an editing and splicing apparatus that is operative to edit and splice film during the course of viewing the film through the projection system of the projector.

To meet these and other objects, the present invention provides an apparatus for editing and splicing motion picture film, the apparatus being adapted for use with the projection system of a motion picture projector. The apparatus includes means for cutting the film and means for aligning the ends of the cut film that remain to be spliced. The apparatus also includes means for moving the film from the projection system to the cutting means and means for splicing the aligned film ends. The apparatus further includes means for sequentially activating the cutting means and the splicing means. The apparatus is so constructed and arranged that, in response to operation of the activating means, the film is automatically moved from the projection system to the apparatus and then edited and spliced.

Thus, in accordance with the present invention, a motion picture projector having a projection system for viewing film, means for supplying film to the projection system, and means for storing the film after it has been viewed, is provided with an apparatus located between the projection system and the film-storing means for editing and splicing the film. The editing and splicing apparatus includes means for cutting the film, means for aligning the film ends to be spliced, means for moving the film from the projection system to the film-cutting means, means for splicing the aligned film ends, and means for sequentially activating the cutting means and the splicing means. The combination is so constructed and arranged that, in response to operation of the activating means, the film is automatically moved from the projection system to the apparatus and then edited and spliced.

The invention, and its objects and advantages, will become more apparent in the detailed description of the illustrated embodiments presented below.

BRIEF DESCRIPTION OF THE DRAWINGS

In the detailed description of the illustrated embodiments of the invention presented below, reference is made to the accompanying drawings, in which.

Figure 12A:
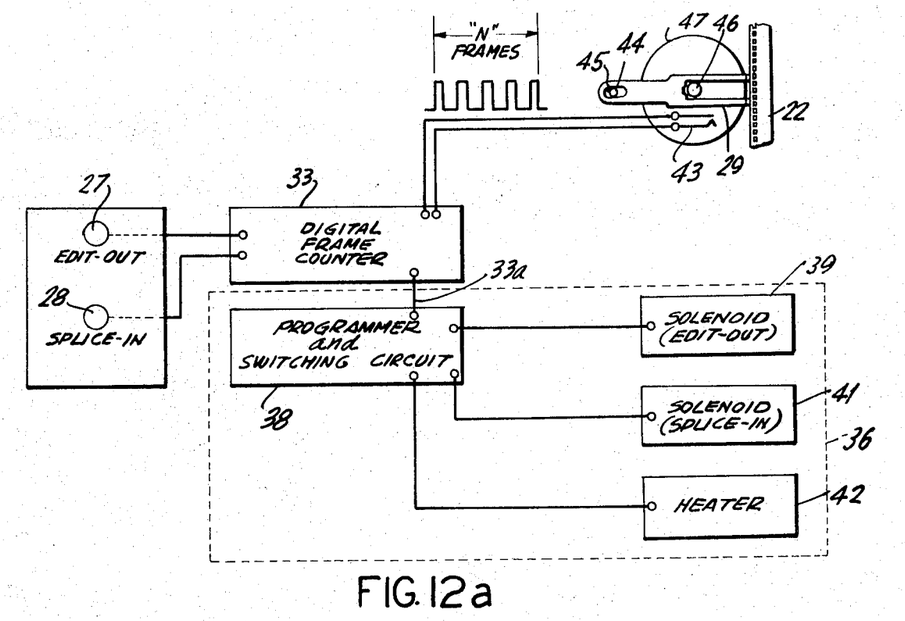
FIGS. 12a and 12b shown, in schematic form, alternative means for sequentially activating the film-cutting means and the film-splicing means incorporated in the apparatus.
Figure 12B:
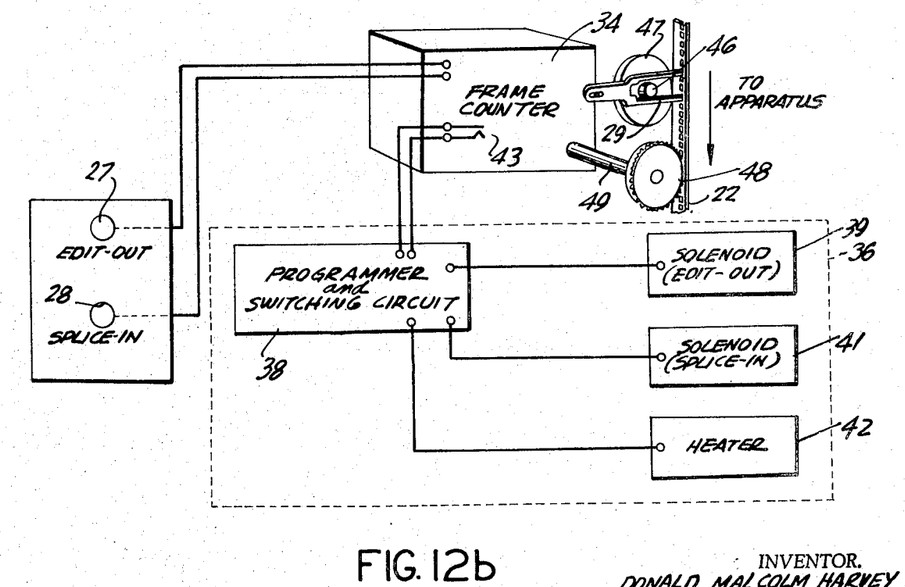

It is to be understood that, for the purpose of simplifying the foregoing drawings, those electrical power sources and electrical connections between electromechanical and electronic components incorporated in the projector that are of conventional construction are generally not illustrated in the drawings except for the idealized schematic format of FIGS. 12a and 12b.

BRIEF DESCRIPTION OF THE ILLUSTRATED EMBODIMENTS

Because certain parts of cinematographic and related apparatus are well known, the following description is directed in particular to those elements forming, or cooperating directly with, the present invention, elements that are not specifically shown or described herein being understood to be selectable from those known in the art.

Figure 1:
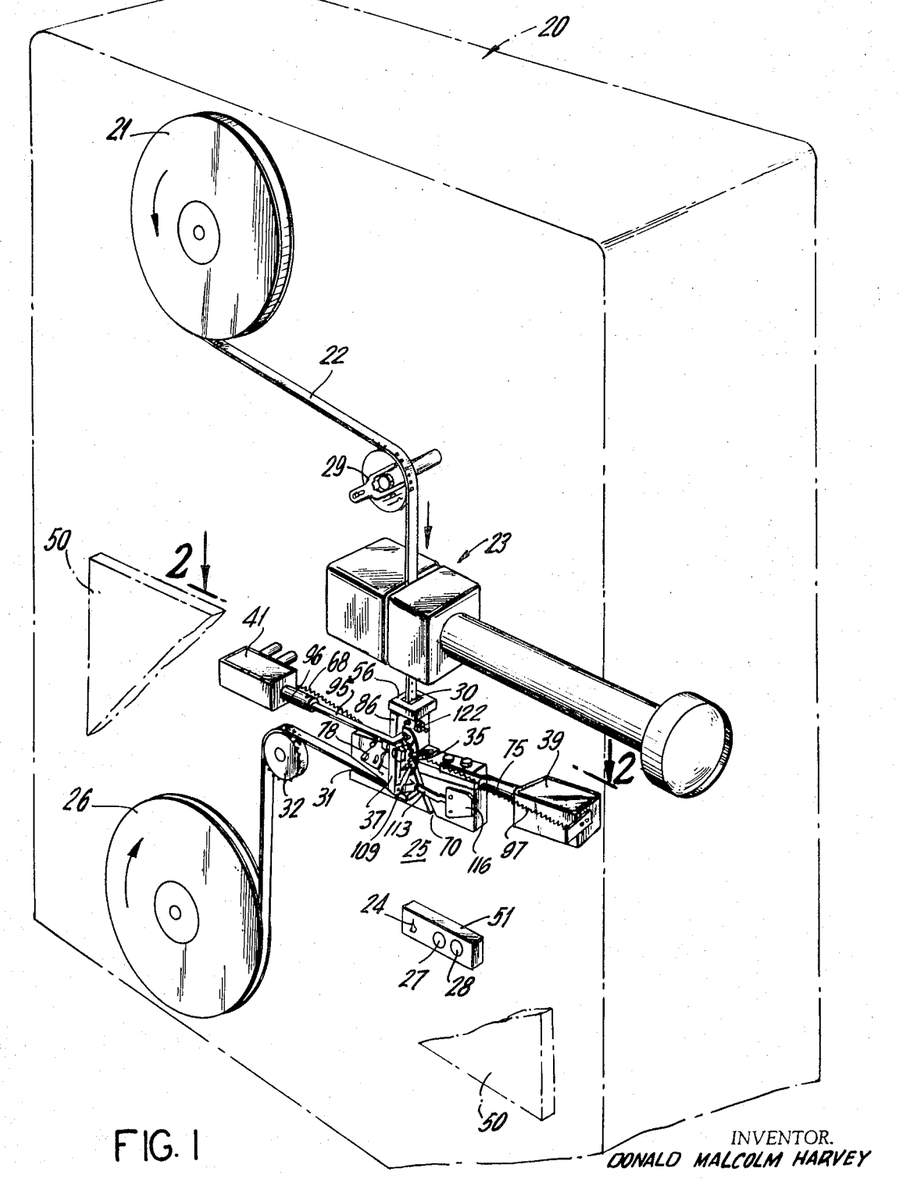
FIG. 1 is a generally schematic perspective view of a motion picture projector incorporating the apparatus of the present invention for editing and splicing film.

Referring to FIG. 1, a motion picture projector 20 constructed in accordance with the present invention comprises a film supply reel 21 for supplying film 22 to a projection system 23 that includes a film gate (not shown), an intermittently operated filmfeeding mechanism that includes a film transport claw 29 for advancing film 22 through the gate, a light source (not shown), and a lens system for projecting images on a conventional screen (not shown). A switch 24 connected to a motor (not shown) controls the direction and rate of film transport. Since such projection systems and their operation are well known in the art and form no part of the present invention, a detailed showing and description thereof is deemed unnecessary.

Film 22 is first run through projection system 23 and then through an apparatus 25 before reaching a film storage or takeup reel 26. Apparatus 25 is constructed in accordance with the invention for editing and splicing that portion of film 22 that is fed thereto after being viewed through projection system 23. After the viewing, editing, and splicing operations have been performed, film 22 is transported from apparatus 25 to film takeup reel 26.

In the embodiment of the invention shown n FIG. 1, editing and splicing apparatus 25 is activated by electromechanical means including solenoids 39 and 41 which are energized in response to sequential operation of switch 27, designated "EDIT-OUT," and a switch 28, designated "SPLICE-IN."

It is to be understood that apparatus 25 could be activated by hand-operated mechanical linkages, such as gear-driven shafts, cam members, and the like, which would be connected to one or more handles mounted on the exterior of projector 20 and which would replace the aforesaid electromechanical means and components associated therewith.

Until editing and splicing of film 22 are desired, operation of projector 20 is conventional. The projectionist operates switch 24 to actuate the intermittent film-feeding mechanism, including film transport claw 29, and thereby move film 22 through the film gate.

As shown in FIG. 1, film 22, upon leaving the film gate, enters apparatus 25 through an entry port 30, leaves apparatus 25 through an exit port 31, and then passes over a sprocket roll 32 to takeup reel 26 for storage. Although the minimum distance of film travel from the film gate to entry port 30 is limited by the physical clearance or separation which must be had between projection system 23 and apparatus 25, the amount of film passing between the film gate and entry port 30 is set, for editing and splicing purposes, at a predetermined number of frames, which, to facilitate explanation, will hereinafter be referred to as the number N.

Prior to editing and splicing, switch 24 is operated by the projectionist to move the first frame of the portion of film 22 that is to be edited into the film gate.

Next, EDIT-OUT switch 27 is operated in order to activate a means for advancing the predetermined number of frames N from the film gate to a filmcutting means 35. The advancing means includes film transport claw 29 and either a digital film frame counter 33 as shown schematically in FIG. 12a or an electromechanical film frame counter 34 as shown schematically in FIG. 12b.

In either case, frame counter 33 or 34 determines the passage of N frames through the film gate. At that time, the first frame selected by the projectionist for editing has been advanced by film transport claw 29 from the film gate to filmcutting means 35, illustrated in detail in FIGS. 4, 4a, 5, 5a, 6, and 7.

Referring to FIGS. 12a and 12b, a signal representative of the advance of the first selected frame to film-cutting means 35 is generated by frame counter 33 or 34 and transmitted to a means 36 for activating film-cutting means 35 and a film-splicing means 37, illustrated in detail in FIGS. 2, 3, 6a, and 8–11. Activating means 36, illustrated schematically in FIGS. 12a and 12b, includes a programmer and switching circuit 38 that is energized by the aforesaid representative signal to deactivate film transport claw 29 and energize solenoid 39, which is incorporated in film-cutting means 35 (FIG. 1), to effect cutting of the film at the leading edge of the first selected frame in a manner to be more fully described below.

By further operation of switch 24, the projectionist positions in the film gate the first frame following the last frame of the portion of film selected for editing. He then operates SPLICE-IN switch 28 to reactivate frame counter 33 or 34 to again develop a signal representative of the advanced of N frames through the film gate. When the Nth frame has been advanced to film-cutting means 35, programmer and switching circuit 38 responds to the representative signal transmitted thereto from frame counter 33 or 34 to again deactivate film transport claw 29, to deenergize solenoid 39, in order to permit a cutting of film 22 at the trailing edge of the last frame to be edited out (that is, the Nth frame advanced to cutting means 35) in a manner to be more fully described below, and to energize solenoid 41, which is incorporated in splicing means 37 in a manner to be more fully described below. Programmer and switching circuit 38 also responds to the representative signal to energize a heater element 42 to effect the desired splice. After the splice is made, programmer and switching circuit 38 automatically deenergizes solenoid 41 and heater element 42 and reactivates film transport claw 29, whereby operation of switch 24 conveys the edited and spliced film to exit port 31 and thence to film storage reel 26.

Figures 13A, 13B, 13C:
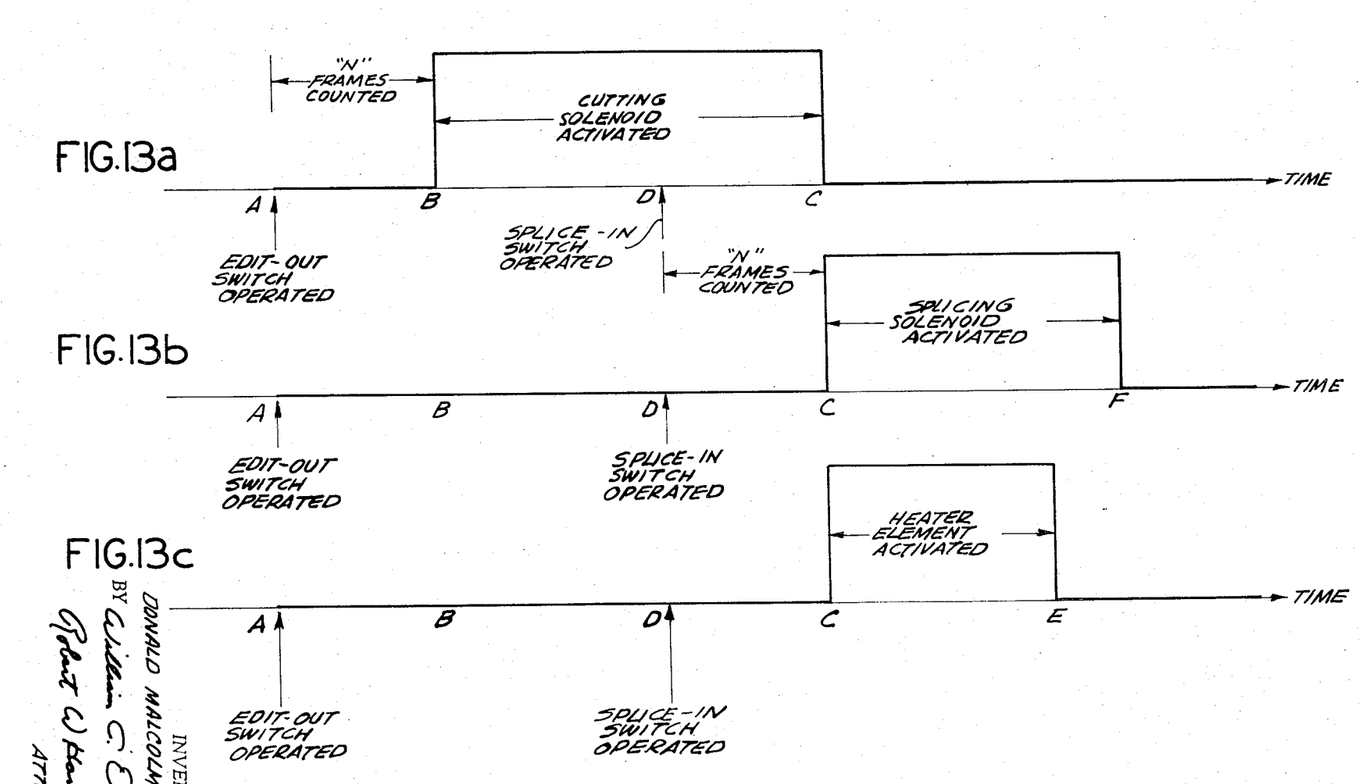
FIGS. 13a, 13b, and 13c show graphically the time sequence of operations of the editing and splicing apparatus in the projector of FIG. 1.

The above-described sequence of film advancing, film editing, and film-splicing operations is shown graphically in FIGS. 13a–13. At the instant of time designated "A," EDIT-OUT switch 27 is operated. At the instant of time designated "B," frame counter 33 or 34 has counted N frames of film 22, transport claw 29 is deactivated, and cutting solenoid 39 is energized to cut film 22 at the leading edge of the first frame to be edited. As will be more fully described below, cutting solenoid 39 remains energized until the instant of time designated "C" has been reached.

At the instant of time designated "D," the projectionist, having positioned in the film gate, by operation of switch 24, the first frame following the last frame to be edited from film 22, operates splice-in switch 28. It is to be understood that the interval of time from B to D is dependent only on the time taken by the projectionist to so position such frame in the film gate.

During the time interval from D to C, frame counter 33 or 34 again counts N frames of film, and at C transport claw 29 is deactivated, cutting solenoid 39 is deenergized, and both splicing solenoid 41 and heater element 42 are energized. Although deenergization of cutting solenoid 39 and energization of splicing solenoid 41 and heater element 42 are shown as events occurring at the same instant of time C, it is to be understood that this showing, for the purpose of simplification, ignores inertial time delay.

At predetermined instants of time designated "E" and "F," heater element 42 and splicing solenoid 41, respectively, are deenergized, and film-advancing claw 29 is reactivated so that, by operation of switch 24, the edited and spliced film can be advanced to film storage reel 26, or additional editing and splicing operations can be effected upon the film being supplied from reel 21.

It is to be understood that the various time intervals shown in FIGS. 13a–13c are illustrated in arbitrary units for simplification and are not meant to represent the ratios of activation times of the various components of editing and splicing apparatus 25, since such time ratios can be selected arbitrarily without reference to the scope of the invention.

Furthermore, it is to be understood that the sequential operation of editing and splicing apparatus 25 can be obtained by means of a conventional multiple-cam-drum programmer which is geared to the main cam plate of projector 20 so as to rotate once per editing and splicing cycle. Such a multiple-cam-drum programmer would replace components 33 or 34 and 38, which are illustrated in FIGS. 12a and 12b and will be described more fully below.

DETAILED DESCRIPTION OF THE ILLUSTRATED EMBODIMENTS

Two embodiment of a suitable film frame counter are illustrated in the drawings. The preferred embodiment, shown schematically in FIG. 12a, includes digital frame counter 33, which is of conventional construction. For example, counter 33 may be a printed circuit element or an appropriate macro-element electronic counting circuit, actuated in response to operation of EDIT-OUT switch 27 to perform the functions of activating film transport claw 29, counting the number of closures of a switch 43 mounted adjacent to claw 29, and, upon counting a predetermined number of such closures, deactivating film transport claw 29 and energizing means 36 for sequentially activating film-cutting means 35 and film-splicing means 37.

Film transport claw 29 is movably mounted by a pin 44 protruding through an elongated slot 45. An eccentric 46 on a driven rotating member 47 moves claw 29 to advanced film 22 in an indexing manner, one frame at a time, to or from the film gate. Each cyclic movement of claw 29 results in one closure of switch 43, which therefore represents an advance of film 22 by an amount equal to one frame.

Digital frame counter 33 is thus designed and constructed to count, after EDIT-OUT switch 27 is operated, N closures of switch 43, which corresponds to an advance of the Nth frame to film-cutting means 35, and to then transmit a signal through a lead 33a to programmer and switching circuit 38, which is constructed and arranged in a conventional manner as, for example, a printed circuit or a macro-element electronic circuit, to energize film-cutting solenoid 39. Frame counter 33 is then deactivated until SPLICE-IN switch 28 is operated, whereupon frame counter 33 is reactivated to count N closures of switch 43 and thereupon transmit a signal through lead 33a to programmer and switching circuit 38 to thereby deenergize film-cutting solenoid 39 and energize both splicing solenoid 41 and heater element 42 to effect the desired splice. The projectionist may then continue viewing the film, or, by reoperation of EDIT-OUT and SPLICE-IN switches 27 and 28, he may perform additional editing and splicing operations.

An alternative embodiment, shown schematically in FIG. 12b, features frame counter 34, which includes a sprocket roll 48 located between film transport claw 29 and editing and splicing apparatus 25. Sprocket roll 48 is mounted on a driven shaft 49 whose revolutions are counted in a conventional manner. Frame counter 34 is activated when EDIT-OUT switch 27 is operated. Counter 34 also includes a cam member (not shown) so disposed that, after a predetermined number of revolutions of shaft 49, which number corresponds to an advance of N frames of film from the film gate, the cam member closes switch 43. The closure of switch 43 completes a suitable circuit path to programmer and switching circuit 38 to effect energization of film-cutting solenoid 39.

At the same time, film transport claw 29 and frame counter 34 are deactivated and remain in that state, except for the activation of claw 29 in response to the projectionist's operation of switch 24 for the purpose of positioning in the film gate the first frame of film following the last frame to be edited out, until SPLICE-IN switch 28 is operated. Operation of SPLICE-IN switch 28 then reactivates claw 29 and counter 34 to effect further film advancement, another counting of N frames of such film advancement, and a second closure of switch 43. Upon this closure of switch 43, claw 29 and counter 34 are again deactivated and programmer and switching circuit 38 is again energized, this time to effect deenergization of cutting solenoid 39 and energization of both splicing solenoid 41 and heater element 42 to effect the desired splice. The projectionist may then continue viewing the film, or, by reoperation of EDIT-OUT and SPLICE-IN switches 27 and 28, perform additional editing and splicing operations.

The specific embodiment of the mechanical and electromechanical components of editing and splicing apparatus 25 will now be described in detail. With reference to FIG. 1, the components of apparatus 25, except frame counter 33 or 34 and programmer and switching circuit 38, which can be mounted at any convenient location within projector 20, are shown mounted on a common plate 50 of suitable size and configuration, although it will be understood that the components of apparatus 25 can be mounted within projector 20 in a number of ways. Also, for the projectionist's convenience, control switches 24 (ON-OFF, FORWARD, REVERSE), 27 (EDIT-OUT), and 28 (SPLICE-IN) can be mounted on a common panel 51 secured to plate 50.

To perform the editing and splicing functions the projectionist first positions in the film gate, by operation of switch 24, the first frame of the portion of film 22 to be edited. EDIT-OUT switch 27 is then operated to activate frame counter 33 or 34. The first frame to be edited out is advanced through entry port 30 of apparatus 25 to a predetermined location where the leading edge of that frame is located adjacent to film-cutting means 35.

Figure 4:
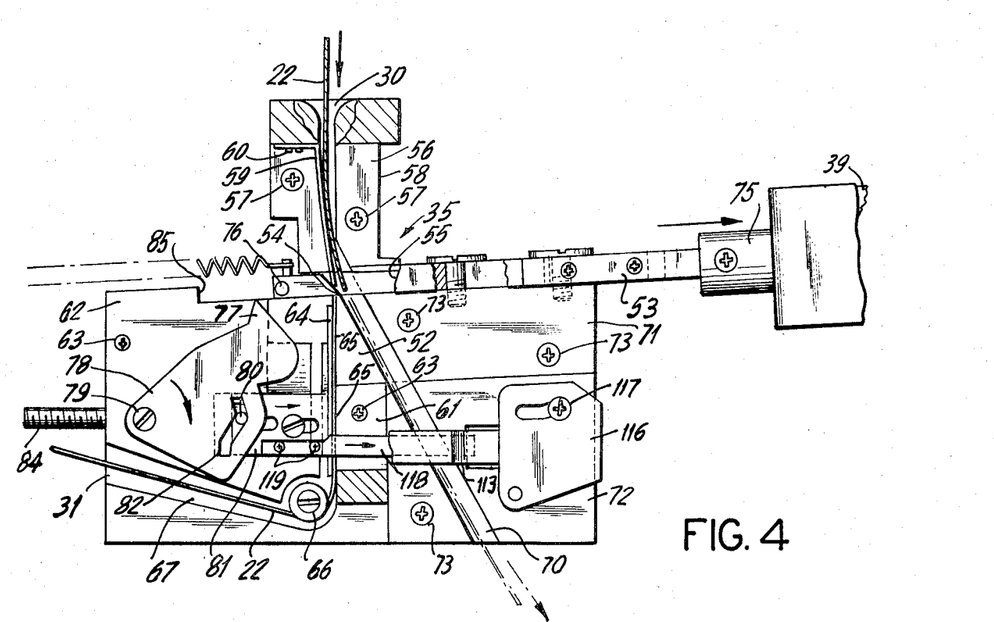
FIGS. 4 and 5 are fragmentary side elevational views of a portion of the apparatus shown in FIG. 3, showing the film-cutting means incorporated in the apparatus at the start and finish, respectively, of the editing operation.

As illustrated in FIG. 4, entry port 30 provides part of the film track that extends through apparatus 25 to exit port 31, entry port 30 being a channel formed in a block 56 which is secured by screws 57 to plate 50. The lower portion of entry port 30 includes the film track between the lower leg 58 of block 56 and a leaf spring 59 which is fastened by a screw 60 to block 56.

Figure 5:
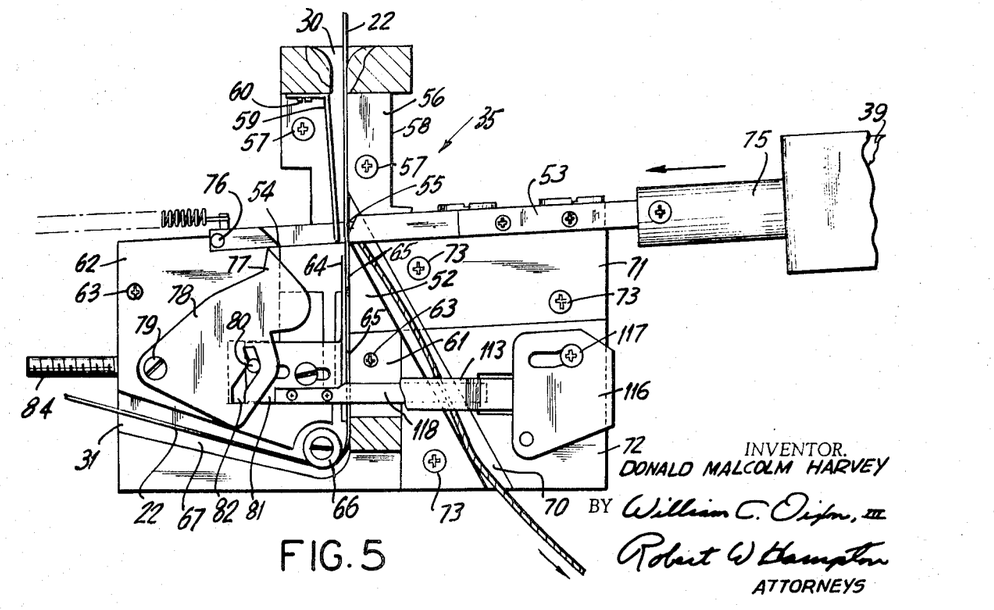

A stationary blade means 52 incorporated in filmcutting means 35 abuts a leg portion 61 of a second block 62 fastened to plate 50 by screws 63. As illustrated in FIGS. 4 and 5, the next portion of the film track through apparatus 25 toward exit port 31 includes a path bounded by a second leaf spring 64 and a contiguous boundary surface 65 of stationary blade means 52 and leg portion 61. Film 22 is then advanced around an idler roller 66, into a channel 67 formed in block 62, through exit port 31, and thence to sprocket roll 32 and film takeup reel 26.

As described above, the first film frame to be edited is advanced in the film track of apparatus 25 to cutting means 35 in response to operation of EDIT-OUT switch 27. With reference to FIGS. 2–5, particularly FIGS. 4 and 5, cutting means 35 includes, in addition to stationary blade means 52, film-cutting solenoid 39 and a movable member means having a cutting edge. In the illustrated embodiment, the movable member means is a reciprocatable slide 53 having a first cutting edge 54 and a second cutting edge 55, hereinafter referred to as first and second spaced blades 54 and 55, respectively.

Figure 4A:
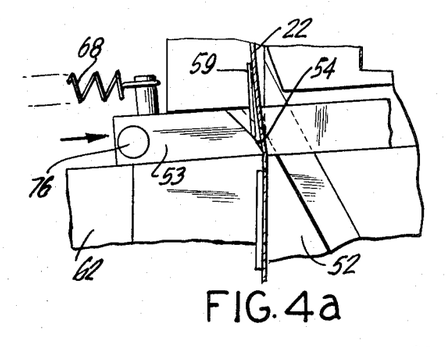
FIGS. 4a and 5a are enlarged, fragmentary, side elevational views of the cutting blade structure shown in FIGS. 4 and 5, respectively, showing the film-cutting action at the start and finish, respectively, of the editing operation.
Figure 5A:
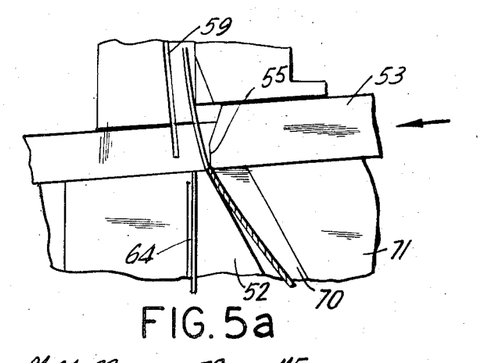

Although blades 54 and 55 have linear cutting edges for making straight-line cuts, as illustrated in FIGS. 4a and 5a, it will be understood that other cutting edge configurations can be used, for example, curvilinear S or U shapes.

Moreover, although cutting means 35, as illustrated in the drawings and more fully described below, includes stationary blade means 52 which cooperates with first and second spaced blades 54 and 55 of reciprocatable slide 53 to cut the film to be edited, it will be understood that other structures can be used.

For example, first and second knife blades pivotally mounted alongside the film track can be used in cooperation with a stationary blade to make the desired film cuts. As another alternative, a single pivotable member having at least one cutting edge can be used in cooperation with a stationary blade means to make the appropriate cuts in the film. Yet another structure can be a conventional punch and die mechanism located on the film track.

Figure 7:
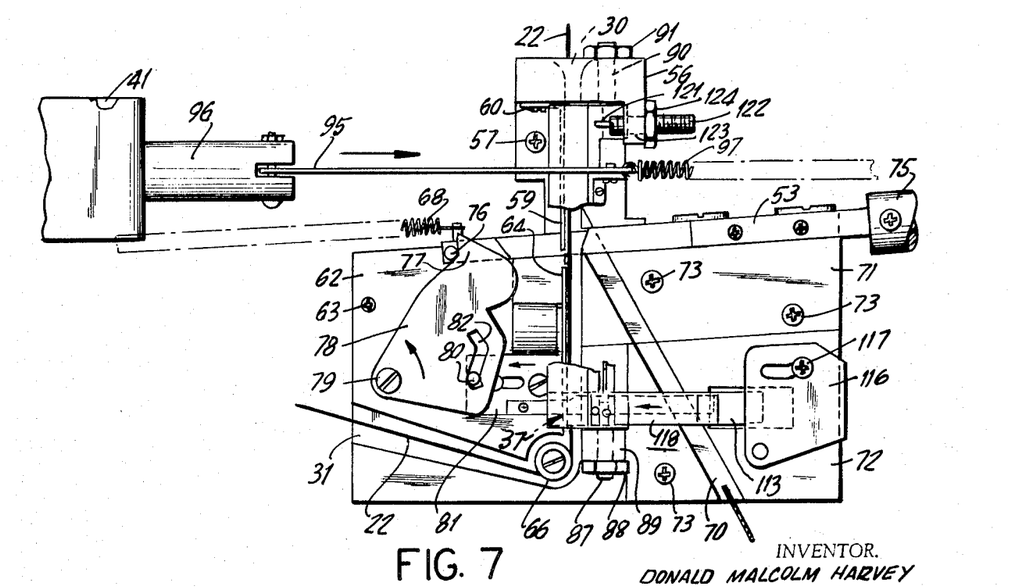

Referring again to FIGS. 2 and 3, reciprocatable slide 53 is held in a rest position, as shown in FIG. 3, under the restraining force of a spring 68 which is pinned at 69 to mounting plate 50. As shown in FIGS. 5 and 7, when slide 53 is in its rest position, blade 55 closes the opening of a film channel 70, part of which is formed by the adjacent surfaces of stationary blade means 52 and a third block 71. Film channel 70 also includes a passageway formed in a fourth block 72 that leads to a festoon chamber (not shown) in which the removed portion of film can be stored. Blocks 71 and 72 are fastened to mounting plate 50 by screws 73.

Figure 3:
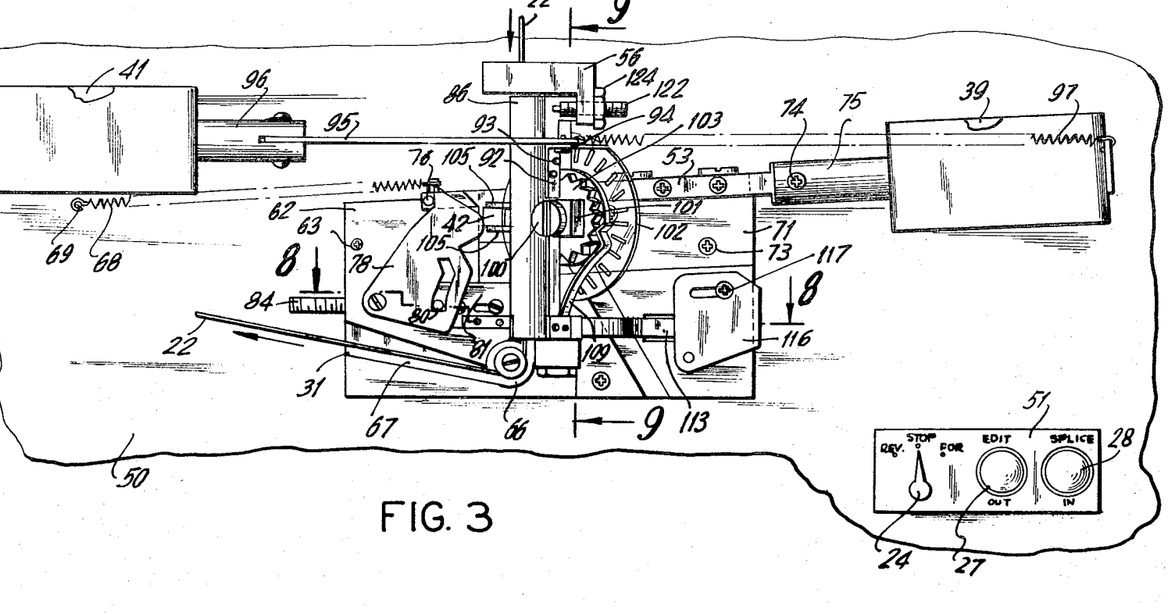
FIG. 3 is a fragmentary side elevational view of the editing and splicing apparatus in the projector of FIG. 1.

With reference to FIG. 3, reciprocatable slide 53 is fastened by screw 74 to an armature 75 of film-cutting solenoid 39. As described above, when EDIT-OUT switch 27 is operated, programmer and switching circuit 38 causes energization of cutting solenoid 39 so as to move slide 53 to the right, as viewed in FIGS. 4 and 4a, against the restraining force of spring 68, and to maintain energization of cutting solenoid 39 until after SPLICE-IN switch 28 is operated. During such movement to the right, blade 54 on slide 53 cooperates with stationary blade means 52 to cut film 22 along the leading edge of the first frame to be edited out, and blade 54 then cooperates with leaf spring 59 to direct said leading edge toward the opening of film channel 70 and thence to the aforementioned festoon chamber.

When slide 53 begins its movement to the right, a pin 76 thereon catches a projecting corner 77 of a plate 78 which is pivotable about a screw 79 that secures plate 78 to block 62. Plate 78 has a cam track 82 formed therein. A post 80 on an L-shaped bracket 81 (FIGS. 4, 5, and 8), which is fastened to leaf spring 64, follows cam track 82 so as to move bracket 81 and thereby force leaf spring 64 against boundary surface 65 in order to prevent the cut film from falling down the lower portion of the film track through apparatus 25. Bracket 81 is held in this position under the restraining force exerted by a spring 83, illustrated in FIG. 8, which is secured inside block 62 by a threaded rod 84.

At this time, the projectionist operates switch 24 to position in the film gate the first frame of film that immediately follows the last frame he selected to be edited out. Because such first frame is the Nth frame to be advanced to film-cutting means 35 after SPLICE-IN switch 28 is operated, and because the leading edge of such first frame is coincident with the trailing edge of the last frame to be edited out, it is apparent that, when SPLICE-IN switch 28 is operated, causing film transport claw 29 and frame counter 33 or 34 to advance and count, respectively, N frames of film from the film gate, the trailing edge of the last frame to be edited out is advanced to cutting means 35. At this time (C in FIGS. 13a–13c), cutting solenoid 39 is deenergized. The restoring force exerted on slide 53 by spring 68 moves slide 53 to the left, back to its rest position against a projecting edge 85 (FIG. 4) of block 62. As slide 53 moves back to this position, blade 55 thereon cooperates with stationary blade means 52 (FIG. 5a) and 5) to cut the film along the trailing edge of the last frame to be edited out. The edited-out portion of the film (FIGS. 6 and 7) then falls down through film channel 70 and into the festoon chamber.

Figure 6:
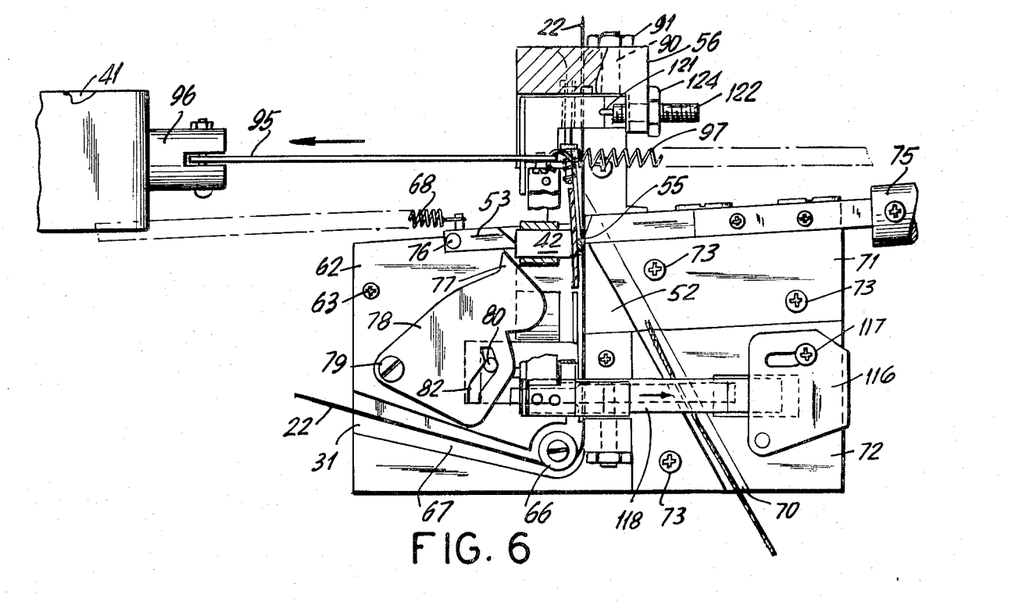
FIGS. 6, 6a, and 7 are fragmentary side elevational views of a portion of the apparatus shown in FIG. 3, showing the splicing means incorporated in the apparatus and the positions of the component parts of the splicing means at selected instants of time during the splicing operation.
Figures 6A, 8, 9, 10, 11:
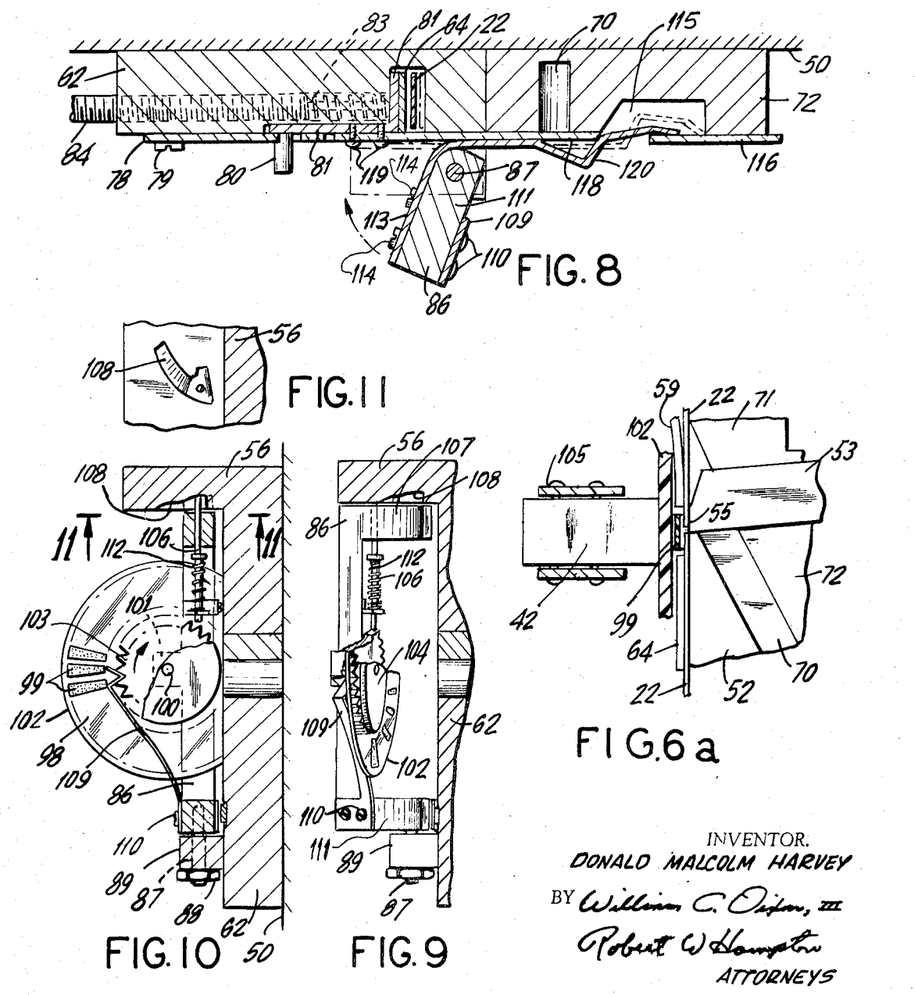
FIG. 8 is a fragmentary horizontal sectional view, taken along line 8-8 of FIG. 3, of a portion of the apparatus shown in FIG. 3.
FIG. 9 is a fragmentary vertical sectional view, taken along line 9-9 of FIG. 3, of a portion of the apparatus shown in FIG. 3, showing a portion of the splicing means at the start of the splicing operation.
FIG. 10 is a fragmentary vertical sectional view of the portion of the splicing means shown in FIG. 9, showing the position of that portion of the splicing means at the time a splice is being made.
FIG. 11 is a fragmentary horizontal sectional view, taken along line 11-11 of FIG. 10, of a portion of the structure shown in FIG. 10.

When slide 53 reaches its rest position, blade 55 thereon closes the opening of film channel 70 and aligns the remaining edges of the film that are to be spliced, as illustrated in FIGS. 5 and 6a. It will be understood, however, that a projecting leg formed on slide 53 could be used instead of blade 55 to align the film edges. Analogous structure for aligning the film edges in the alternative embodiments of cutting means 35 suggested above could be used when such embodiments replace the reciprocatable slide structure illustrated in the drawings. Furthermore, it will be understood that the aligning of the film edges could also be performed by analogous structure incorporated in splicing means 37, to be described in detail below.

As described above, operation of SPLICE-IN switch 28 results in deenergization of film-cutting solenoid 39 and energization of splicing solenoid 41 to initiate the splicing operation performed by splicing means 37, which first forms a permanent splice at the aligned film edges and then effects a release of the spliced film by the return of bracket 81 to its rest position, thereby removing spring 64 from contact with the spliced film. At this time, the projectionist may continue to view film 22 as supplied from reel 21 or he may effect additional editing and splicing of the film.

Referring now to FIGS. 9 and 10, splicing means 37 includes a generally U-shaped block 86 pivotably fastened at one end thereof by a threaded pin 87 and nut 88 to a projecting leg 89 of block 62. The other end of block 86 is secured to block 56, as illustrated in FIGS. 6 and 7, by means of a second threaded pin 90 and nut 91, so that block 86 is pivotable about the center line common to nuts 88 and 91.

Figure 2:
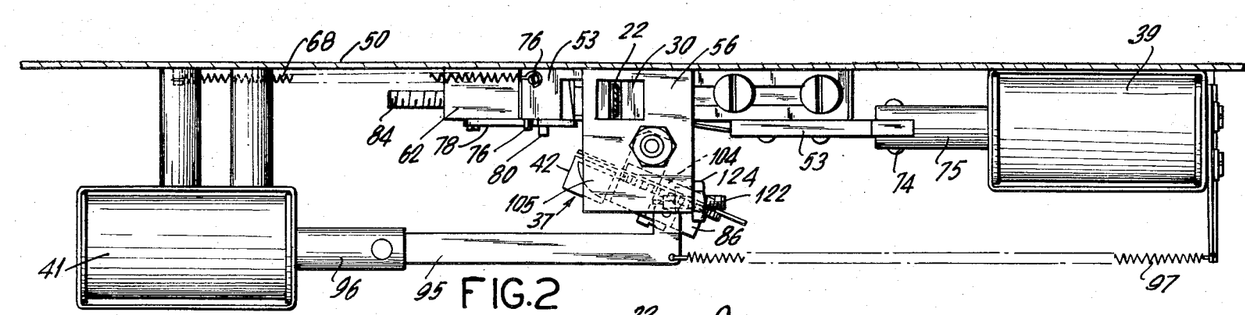
FIG. 2 is a fragmentary horizontal sectional view, taken along line 2-2 of FIG. 1, of the editing and splicing apparatus in the projector of FIG. 1.

As illustrated in FIGS. 2 and 3, an L-shaped bracket 92 is fastened to block 86 by a screw 93. Bracket 92 is, in turn, secured by a screw 94 to a linkage 95 which is fastened to an armature 96 of film-splicing solenoid 41. Linkage 95 is held in its rest position, shown in FIGS. 2 and 3, under the restraining force of a spring 97 secured at one end to linkage 95 and at the other end to a projecting edge of film-cutting solenoid 39.

When film splicing solenoid 41 is energized, thereby moving armature 96 to the left as shown in FIG. 6, block 86 pivots about the axis defined by the center line of nuts 88 and 91 from the position shown in FIG. 9 to the position shown in FIG. 10 in order to effect the splicing operation to be described in detail below.

Referring again to FIGS. 9 and 10, splicing means 37 includes a means 98 for supplying splicing material. Supplying means 98 is secured by a screw 100 to a projecting leg 101 of block 86 and includes a wheel 102 having thereon a plurality of patches of thermosetting splicing material 99. Wheel 102 is held between a ratchet 103 and a nut 104, both of which are threaded on screw 100.

A pair of projecting legs 105 (FIGS. 2 and 3), integrally formed on or fastened to block 86 on the side of block 86 opposite to projecting leg 101, hold heater element 42, which is electrically energized in the manner described above with reference to FIGS. 12a, 12b, and 13a–13c. When splicing means 37 is pivoted to the position shown in FIGS. 10, heater element 42 cooperates with leaf spring 59 to restrain the upper portion of the film to be spliced and abuts wheel 102 to force a patch of thermosetting splicing material 99 against the aligned film edges, as illustrated in FIGS. 6a. Heat and pressure provided by heater element 42 through wheel 102 effect a transfer of the patch of splicing material 99 to the film, causing the patch to adhere to the aligned film edges and thereby form a permanent splice.

Although the use of thermosetting splicing material is disclosed, it will be understood that pressure-sensitive splicing material could be used. In that case, heater element 42 (FIG. 6a) would be replaced by a pressure-applying platen, and wheel 102 would include a plurality of preperforated patches of pressure-sensitive splicing material. Movement of the pressure-applying platen toward the film to be spliced, in a manner similar to that described above with reference to heater element 42, would cause fracturing of the perforated patch and a transfer of the patch material to the aligned film edges to effect a splice.

It will be further understood that liquid-splicing material could be used in place of the thermosetting splicing material described above. In that case, a reservoir of liquid-splicing material would be incorporated in splicing means 37, which would also include a tube for directing a stream of the liquid-splicing material to the aligned film edges. The liquid-splicing material so transferred to the aligned film edges would then be allowed to dry at room temperature, or a heat source such as an electrical resistance wire could be provided in splicing means 37 to decrease the drying time required.

As an alternative to the foregoing methods, splicing of the aligned film edges could be effected without using a splicing material, for example, by use of a heat-welding technique. In that case, a heat source such as an iron provided in the splicing means could be advanced to the aligned film edges in a manner similar to that described above with reference to heater element 42 so as to melt the portions of film adjacent to the aligned edges and thereby effect a splice. In the same manner, an ultrasonic-energy-emitting device could be used to weld the aligned film edges together.

Returning to the illustrated embodiment of splicing means 37, with particular reference to FIGS. 9, 10, and 11, a mechanism is incorporated therein for rotating wheel 102 to bring a patch of splicing material 99 to the aligned film edges to be spliced. This mechanism includes a spring-loaded pawl 106, one end of which rests against a tooth of ratchet 103 when splicing means 37 is in its rest position as shown in FIG. 9. The other end of pawl 106 extends through an upper arm 107 of block 86 to a cam track 108 which is formed in block 56. In its rest position, pawl 106 prevents rotation of ratchet 103.

However, when film splicing solenoid 41 is energized, causing rotation of splicing means 37 from its rest position shown in FIG. 9 to the position shown in FIGS. 10, pawl 106 follows cam track 108 and thereby releases ratchet 103, as shown in FIG. 10. Ratchet 103 is then free to rotate in response to the force exerted upon a tooth thereof by a leaf spring 109 which is fastened by screws 110 to a lower leg 111 of block 86. Rotation of ratchet 103 causes rotation of wheel 102 secured thereto, thereby bringing a patch of splicing material 99 into alignment with heater element 42 (FIG. 6a).

When film splicing solenoid 41 is deenergized, the restoring force of spring 97 applied to armature 96 through linkage 95 causes splicing means 37 to rotate from the position shown in FIGS. 10 back to its rest position shown in FIG. 9. Pawl 106 again follows cam track 108 and engages another tooth of ratchet 13, rotating ratchet 103 enough to allow leaf spring 109 to slip to another tooth of ratchet 103. The spring constants of a spring 112, within which pawl 106 rides, and leaf spring 109 are so selected that, during the return of splicing means 37 to its rest position shown in FIG. 9, energy is imparted to and stored in leaf spring 109 in order to effect rotation of ratchet 103 and wheel 102 during a subsequent editing and splicing operation.

As described above with reference to FIGS. 4 and 5, during the film-cutting operation resulting from movement of slide 53, bracket 81 is moved, causing leaf spring 64 secured thereto to engage the film to be spliced and to hold the film during the splicing operation. A mechanism that is rendered operative in response to deactivation of splicing means 37 is accordingly provided to effect disengagement of leaf spring 64 from the film after the splicing operation is completed.

Referring now to FIGS. 8, which shows in solid lines the rest position of splicing means 37 and in broken lines the position of splicing means 37 after energization of splicing solenoid 41, a second leaf spring 113 is fastened at one end thereof by screws 114 to lower leg 111 of block 86. The other end of leaf spring 113 is constrained to move in a channel formed by a suitably proportioned groove 115 in block 72 and a bracket 116 overhanging groove 115. Bracket 116 is adjustably fastened by a screw 117 to block 72, as shown in FIGS. 6 and 7.

Leaf spring 113 overlies a bracket 118 which is secured to bracket 81 by screws 119, as shown in FIGS. 4, 5, and 8, so that, when bracket 81 is moved to the right as viewed in FIG. 4, upon energization of cutting solenoid 39 causing leaf spring 64 on bracket 81 to engage the cut film, bracket 118 is moved to the right as viewed in FIG. 4 to the position sown in FIG. 8.

When splicing solenoid 41 is energized, leaf spring 113 assumes the position shown in broken lines in FIG. 8 with a projecting lip 120 thereof overlying an edge of bracket 118. When splicing solenoid 41 is deenergized and splicing means 37 rotated, under the restoring force of spring 97, back to its rest position shown in solid lines in FIG. 8, lip 120 catches said edge of bracket 118 and forces bracket 118 to the left as viewed in FIGS. 7 and 8, thereby moving bracket 81 secured to bracket 118 back to its rest position sown in FIGS. 3 and 7, thereby disengaging spring 64 from the spliced film.

The return of bracket 81 to its rest position compresses spring 83 (FIG. 8) and restores plate 78 to its rest position, shown in FIG. 3. The return movement of splicing means 37 to its rest position, shown in FIG. 9, is halted by block 86 thereof engaging a projecting stop 121 on a threaded rod 122 which is threaded through a downwardly extending leg 123 of block 56 and locked therein by a nut 124, as shown in FIG. 7.

Upon completion of this sequence of movements, the projectionist, by operation of switch 24, may view the results of his editing or he may edit other portions of film 22 supplied from reel 21 or he may continue viewing the balance of the film. It will be understood, therefore, that a motion picture projector having apparatus for editing and splicing film in accordance with the above-described invention is so constructed and arranged that the projectionist may use the viewing, editing, and splicing features thereof, in conjunction with a conventional projection screen on which images are projected from the film gate, merely by operation of switches such as those shown in FIG. 1.

The invention has been described in detail with particular reference to the illustrated embodiments thereof, but it will be understood that variations and modifications can be effected within the spirit and scope of the invention.

I claim:

1. In a motion picture projector providing a film path from a film supply means through a projection system to a film takeup means, an apparatus for editing motion picture film in the film path between the projection system and the film takeup means, the editing being accomplished by first cutting out a selected portion of the film and then splicing the two remaining ends of the film corresponding to the leading and trailing ends of the selected portion, said apparatus comprising:

a. means, selectively activatable and deactivatable, for cutting the film at the leading and trailing ends of the selected portion after the film has passed through the projection system, said cutting means being disposed relative to the projection system so as to cut the film at a predetermined location corresponding to the position of a frame of the film which is a predetermined number of frames removed from the projection system;

b. means, activatable and deactivatable, for supporting one of the two remaining ends of the film adjacent to said predetermined location;

c. means, activatable and deactivatable, for directing the selected portion of the film away from said predetermined location;

d. means, activatable and deactivatable, for splicing the two remaining ends of the film while the one remaining end is supported by said supporting means; and e. means for controlling said apparatus including i. first means responsive to a first command for effecting passage of the predetermined number of frames of the film through the projection system, for activating said cutting means to cut the film at the leading end of the selected portion, and for activating said directed means to direct the leading end of the selected portion away from said predetermined location, and ii. second means responsive to a second command for effecting passage of the predetermined number of frames of the film through the projection system, for activating said cutting means to cut the film at the trailing end of the selected portion, and for activating said splicing means to splice the two remaining ends of the film.

2. The apparatus claimed in claim 1 wherein said cutting means includes a movable member having a cutting edge adapted to form a cut extending across the width of the film, said member being movable in response to said first and second means to cut the film at the leading and trailing ends, respectively, of the selected portion.

3. The apparatus claimed in claim 1 wherein said cutting means includes i. stationary blade means disposed adjacent to said predetermined location, ii. first and second movable blade means, and iii. means for moving said first and second movable blade means sequentially into cooperation with said stationary blade means for cutting the film at the leading and trailing ends, respectively, of the selected portion, said moving means being sequentially responsive to said first and second means.

4. The apparatus claimed in claim 3 wherein said first and second movable blade means are spaced apart and facing each other and disposed at opposite sides, respectively, of the film path.

5. The apparatus claimed in claim 3 wherein said moving means reciprocates said first and second movable blade means relative to said stationary blade means.

6. The apparatus claimed in claim 3 wherein a portion of said second movable blade means extends substantially parallel with the film at said predetermined location and wherein said moving means includes means for holding said portion of said second movable blade means adjacent to and substantially parallel with the other of the two remaining ends of the film, said second movable blade means thereby being adapted to position the other of the two remaining ends of the film into alignment with the one remaining end of the film to be spliced therewith after the film has been cut at the leading and trailing ends of the selected portion.

7. The apparatus claimed in claim 1 wherein said supporting means includes
   i. a supporting surface extending in a direction parallel with the film path from said predetermined location toward the film takeup means, said supporting surface being adapted to receive a surface of the one remaining end of the film, and
   ii. means, spaced from and having a surface extending substantially parallel with said supporting surface, for urging the one remaining end of the film against said supporting surface when the one remaining end is disposed between said supporting surface and said urging means surface.

8. The apparatus claimed in claim 7 wherein said urging means includes a resilient member biased toward said supporting surface.

9. The apparatus claimed in claim 1 wherein said directing means includes structure defining a passage having an entrance adjacent to said predetermined location and extending therefrom in a direction at an angle to the film path.

10. The apparatus claimed in claim 9 wherein a portion of said cutting means deflects the leading end of the selected portion of the film into said passage.

11. The apparatus claimed in claim 9 wherein said cutting means includes
    i. stationary blade means disposed adjacent to said predetermined location,
    ii. first and second movable blade means, and
    iii. means for moving said first and second movable blade means sequentially into cooperation with said stationary blade means for cutting the film at the leading and trailing ends, respectively, of the selected portion, said moving means being sequentially responsive to said first and second means,
and wherein a portion of said first movable blade means is adapted to deflect the leading end of the selected portion of the film into said passage when said portion of said first movable blade means is adjacent to said stationary blade means 12. The apparatus claimed in claim 11 wherein said portion of said first movable blade means includes surface facing the film path at said predetermined location and sloping toward said entrance of said passage when said portion of said first movable blade means is adjacent to said stationary blade means.

13. The apparatus claimed in claim 1 wherein said splicing means includes
    i. means for supplying splicing material to the film path at said predetermined location, and
    ii. means responsive to said second means for applying a portion of the splicing material to the two remaining ends of the film at said predetermined location.

14. The apparatus claimed in claim 13 wherein said supplying means includes
    i. cam surface means,
    ii. a member movable relative to said cam surface means from a first position to a second position in response to activation of said splicing means,
    iii. rotatable ratchet means carried by said movable member,
    iv. means rotatable with said ratchet means for holding the splicing material,
    v. movable cam follower means carried by said movable member and engaging said cam surface means,
    vi. pawl means coupled to said cam follower means for movement into and out of engagement with said ratchet means as said movable member moves to and from said first position, respectively, and
    vii. deflectable spring means for imparting a rotational force to said ratchet means,
whereby, in response to activation of said splicing means, said movable member moves relative to said cam surface means from said first position to said second position, causing said cam follower means to follow said cam surface means and said pawl means to move out of engagement with said ratchet means, thereby releasing said ratchet means to rotate under the rotational force imparted thereto by said spring means to position the portion of the splicing material adjacent to the two remaining ends of the film at said predetermined location, and, in response to deactivation of said splicing means, said movable member moves relative to said cam surface means from said second position to said first position, casing said cam follower means to follow said cam surface means and said pawl means to move into engagement with said ratchet means, thereby rotating said ratchet means a predetermined amount and deflecting said spring means to impart potential energy thereto for rotating said ratchet means in response to a subsequent activation of said splicing means.

15. The apparatus claimed in claim 14 wherein said applying means includes means for advancing said holding means toward the two remaining ends of the film at said predetermined location, said advancing means thereby applying the portion of the splicing material to the two remaining ends of the film at said predetermined location.

16. The apparatus claimed in claim 13 wherein said applying means includes means for applying heat to the splicing material supplied to the film path at said predetermined location.

17. The apparatus claimed in claim 14 wherein said supplying means further includes electromechanical means for moving said movable member.

18. The apparatus claimed in claim 1 wherein said first and second means include means for counting the predetermined number of frames of the film passing through the projection system, said cutting means being sequentially activated in response to said first command to cut the film at the leading end of the selected portion and in response to said second command to cut the film at the trailing end of the selected portion.

19. The apparatus claimed in claim 18 wherein said counting means includes means responsive to the passage of each frame of the film through the projection system for producing an intermediate function and means responsive to an accumulation of intermediate functions corresponding to the predetermined number of frames for producing an output function to activate said cutting means.

20. In a motion picture projector providing a film path from a film supply means through a projection system to a film takeup means, a method for editing motion picture film in the film path between the projection system and the film takeup means, the editing being accomplished by first cutting out a selected portion of the film having a predetermined number of frames and then splicing the two remaining ends of the film corresponding to the leading and trailing ends of the selected portion, said method comprising the steps of:
  a. sequentially effecting passage of the selected portion of the film through the projection system, cutting the film at the leading end of the selected portion, effecting passage of the predetermined number of frames through the projection system, cutting the film at the end of the selected portion said cutting being performed at a predetermined location corresponding to the position along the film path of a frame of the film which is the predetermined number of frames removed from the projection system;

b. supporting one of the two remaining ends of the film at said predetermined location;

c. directing the selected portion of the film away from said predetermined location; and d. splicing the two remaining ends of the film while the one remaining end is supported at said predetermined location.

21. The method claimed in claim 20 wherein said cutting step includes moving first and second movable blade means sequentially into cooperation with a stationary blade means to cut the film at the leading and trailing ends, respectively, of the selected portion.

22. The method claimed in claim 21 wherein said first and second movable blade means are moved from an initial position in which they are spaced apart and facing each other and disposed at opposite sides, respectively, of the film path.

23. The method claimed in claim 21 wherein said moving step includes reciprocating said first and second movable blade means relative to said stationary blade means.

24. The method claimed in claim 21 wherein said moving step includes holding a portion of said second movable blade means adjacent to and substantially parallel with the film at said predetermined location to position the other of the two remaining ends of the film into alignment with the one remaining end of the film to be spliced therewith after the film has been cut at the leading and trailing ends of the selected portion.

25. The method claimed in claim 20 wherein said directing step includes urging the leading end of the selected portion into a passage having an entrance adjacent to said predetermined location and extending therefrom in a direction at an angle to the film path.

26. The method claimed in claim 21 wherein said directing step includes deflecting the leading end of the selected portion away from said predetermined location by movement of said first movable blade means.

27. The method claimed in claim 20 wherein said splicing step includes the steps of i. supplying splicing material to the film path at said predetermined location, and ii. applying a portion of the splicing material to the two remaining ends of the film at said predetermined location.

28. The method claimed in claim 27 wherein said applying step includes advancing the splicing material to the two remaining ends of the film at said predetermined location.

29. The method claimed in claim 27 wherein said applying step includes applying heat to the splicing material supplied to the film path at said predetermined location.

30. The method claimed in claim 20 wherein said cutting step further includes the step of counting the predetermined number of frames of the film passing through the projection system, said counting step being activated a first time in response to said step of activating said first means and a second time in response to said step of activating said second means.

31. The method claimed in claim 30 wherein said counting step includes the steps of producing an intermediate function in response to the passage of each frame of the film through the projection system, accumulating a number of such intermediate functions that is related to the predetermined number of frames, and producing an output function that is related to said umber of intermediate functions.

* * * * *